(12) United States Patent
Desfriches et al.

(10) Patent No.: US 9,358,982 B2
(45) Date of Patent: Jun. 7, 2016

(54) METHOD FOR PROCESSING DATA IN A DEVICE FOR POWER ASSISTANCE OF UPHILL MANEUVERS OF A MOTOR VEHICLE

(75) Inventors: Christophe Desfriches, Pacy-sur-Eure (FR); Alessandro Monti, La Garenne Colombes (FR); Richard Pothin, Jouars-Pontchartrain (FR)

(73) Assignee: RENAULT S.A.S., Boulogne-Billancourt (FR)

(*) Notice: Subject to any disclaimer, the term of this patent is extended or adjusted under 35 U.S.C. 154(b) by 1115 days.

(21) Appl. No.: 12/667,957

(22) PCT Filed: Jun. 30, 2008

(86) PCT No.: PCT/FR2008/051205
§ 371 (c)(1),
(2), (4) Date: Mar. 17, 2010

(87) PCT Pub. No.: WO2009/007629
PCT Pub. Date: Jan. 15, 2009

(65) Prior Publication Data
US 2010/0179738 A1    Jul. 15, 2010

(30) Foreign Application Priority Data

Jul. 6, 2007 (FR) ..................... 07 04892

(51) Int. Cl.
*G06F 19/00* (2011.01)
*B60W 30/18* (2012.01)
*F16D 48/06* (2006.01)
*B60W 50/00* (2006.01)

(52) U.S. Cl.
CPC ......... *B60W 30/18118* (2013.01); *F16D 48/06* (2013.01); *B60W 2050/004* (2013.01); *B60W 2510/0225* (2013.01); *B60W 2540/14* (2013.01); *F16D 2500/3026* (2013.01); *F16D 2500/30421* (2013.01); *F16D 2500/3144* (2013.01); *F16D2500/31413* (2013.01); *F16D 2500/31453* (2013.01); *F16D 2500/50825* (2013.01); *F16D 2500/7044* (2013.01); *F16D 2500/70235* (2013.01); *F16D 2500/70252* (2013.01); *F16D 2500/70605* (2013.01)

(58) Field of Classification Search
CPC .............. B60W 30/18118; F16D 2500/70605; F16D 2500/7044
USPC ............................... 701/67, 70, 68
See application file for complete search history.

(56) References Cited

U.S. PATENT DOCUMENTS

| 5,337,868 A | 8/1994 | Liu et al. |
| 2002/0038750 A1 | 4/2002 | Bulgrien |
| 2006/0049691 A1 | 3/2006 | Deprez et al. |
| 2006/0106520 A1* | 5/2006 | Bodin et al. ............ 701/67 |

FOREIGN PATENT DOCUMENTS

| DE | 10 2004 043 541 | 6/2005 |
| GB | 2 376 990 | 12/2002 |

* cited by examiner

*Primary Examiner* — Redhwan K Mawari
*Assistant Examiner* — Rodney P King
(74) *Attorney, Agent, or Firm* — Oblon, McClelland, Maier & Neustadt, L.L.P.

(57) ABSTRACT

A method for processing data recorded during a data acquisition, the data defining a correspondence between values representing torque transmitted by a clutch and values representing a position of a clutch control member. The processing method includes modifying the recorded data to define a modified correspondence between the values representing the torque transmitted by the clutch and the values representing the position of the clutch control member, the modified correspondence to be used in a hill start assist device of a motor vehicle including a power train connected to drive wheels by a transmission system including the clutch and a braking system, whereby the release of the braking system is automatically controlled by the assist device.

17 Claims, 3 Drawing Sheets

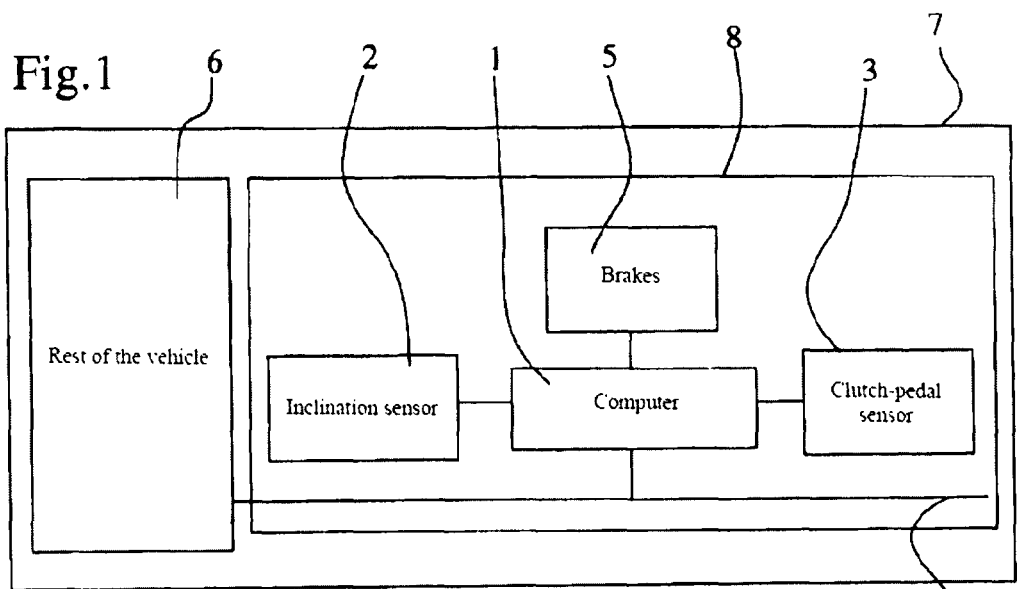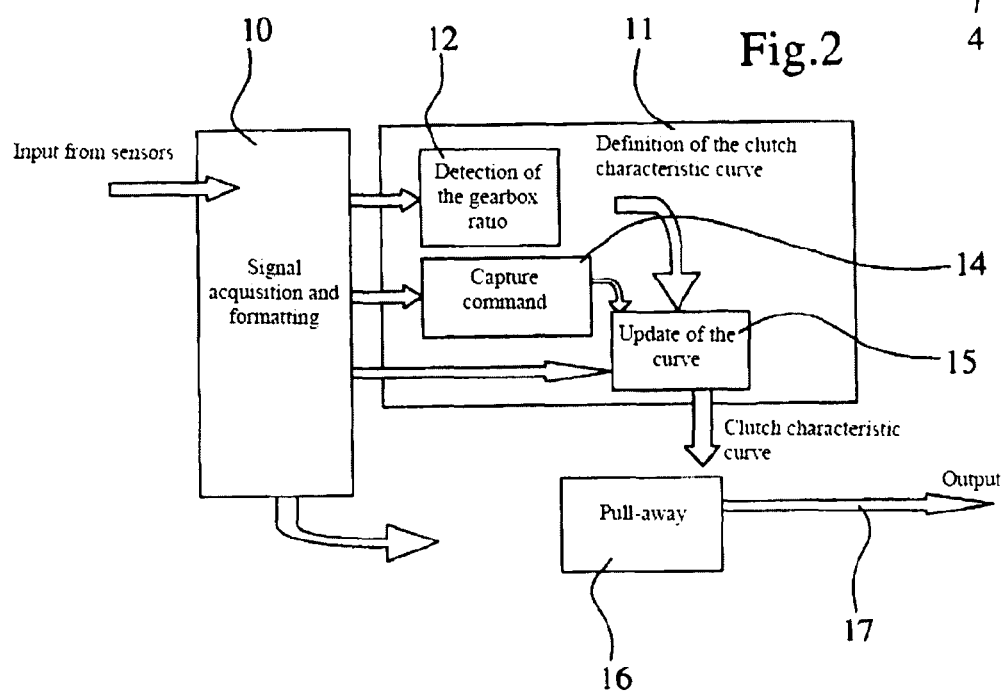

METHOD FOR PROCESSING DATA IN A DEVICE FOR POWER ASSISTANCE OF UPHILL MANEUVERS OF A MOTOR VEHICLE

BACKGROUND

The invention relates to a device for power assistance of uphill maneuvers of a motor vehicle.

Such a power-assistance device is known from Application FR 2828450, the contents of which are incorporated by reference in the present Application. It comprises mainly a means for estimating the slope on which the vehicle is positioned, a means for interpreting the actions of the driver, a means for determining a clutch characteristic curve of the vehicle (or in other words a curve of correspondence of the clutch-pedal position with the torque that can be transmitted by the clutch) and a means for automatically deactivating a braking means of the vehicle. By virtue of these means, the motor vehicle can be held in position on a slope in a state in which the driving wheels are disengaged from the engine and can be caused to move (in the direction of climbing the slope) solely by the actions of the driver on the accelerator and clutch pedals (or in other words without any need for the driver to act on the parking brake). In fact, the functional strategy of the power-assistance device is to release the brake system as soon as the engine torque transmitted to the wheels is sufficient to compensate for the force on the vehicle due to the slope and to gravity.

This type of device offers numerous advantages in terms of simplicity and driving comfort. However, it has two disadvantages, to be explained hereinafter.

Firstly there exists a problem of starting in the case of gentle slopes or level pavement. In fact, according to the strategy indicated above, one waits for a sufficient torque to be transmitted to the driving wheels in order to release the brake. It is understood that this strategy is of such nature to create an odd sensation in the user and the occupants of the vehicle: there is a sensation that the elements connecting the vehicle to the ground are straining before the brake is released. This sensation seems odd inasmuch as it is not felt in a traditional vehicle, in which the parking-brake system is released before the beginning of engagement of the clutch. In fact, this straining of the elements connecting to the ground is not necessary inasmuch as, on a gently sloping or level pavement, the vehicle, under the effect of friction and rolling resistance, the vehicle remains immobile or quasi-immobile, even in a declutched state with the brake system released.

Finally, the power-assistance device mentioned above necessitates a transitional phase, at the beginning of operation in traffic, during which this device is not operational or functions imperfectly, and during which this device records data necessary for construction of a characteristic curve of the torque that can be transmitted by the clutch according to the position of the clutch pedal. This characteristic curve is then used to determine the instant at which release of the brake system must be commanded. Normally this curve is strictly monotonic. Nevertheless, it may happen that, at a given instant during the transitional learning phase, the recorded data define a non-monotonic characteristic curve capable of creating a lack of robustness of the power-assistance device and of interfering with its proper functioning if the curve is eventually used. In addition, this transitional learning phase is quite lengthy, particularly as regards learning of data in the high-torque zone. Consequently, the power-assistance device cannot be used promptly and in particular it cannot be used promptly in the situation in which it offers its greatest interest, or in other words that of a steep slope, where a large engine torque is necessary for starting the vehicle.

BRIEF SUMMARY

The objective of the invention is to provide a data-processing method making it possible to overcome the disadvantages mentioned above and to improve the data-processing methods known from the prior art. In particular, the invention proposes a data-processing method making it possible to avoid the straining of the elements connecting the vehicle to the ground when the vehicle is on a gentle slope or on level ground and to make the power-assistance device more robust during the transitional phase of learning of the clutch characteristic.

To this end the method according to the invention permits the processing of data during a data-acquisition step, these data defining a correspondence relationship between values of torques transmitted by a clutch and values of positions of a clutch-control device. It is characterized in that the processing method comprises a step of modifying recorded data in order to define a modified correspondence relationship between values of torques transmitted by a clutch and values of positions of the clutch-control device, this modified correspondence relationship being intended to be used in a device for power assistance of uphill maneuvers of a motor vehicle equipped with a motive power assembly connected to driving wheels by a kinematic chain comprising the clutch and a brake system, the power-assistance device automatically commanding release of the brake system.

The step of modifying recorded data may comprise a procedure of substituting the smallest value of position of the control device of the clutch by a substitution value smaller than the substituted value.

The substitution value may be greater than or equal to a predefined value.

The step of modifying data may comprise a procedure of adding data.

The procedure of adding data may comprise adding two pairs of values of positions of the clutch-control device and of torque values, such that the values of added torques are greater than the torque values recorded during the data-acquisition step and such that the added values of positions of the clutch-control device are greater than the values of positions of the clutch-control device recorded during the data-acquisition step.

A data medium according to the invention comprises an algorithm for employing a processing method defined above.

According to the invention, a device for power assistance of uphill maneuvers of a motor vehicle comprises hardware and software means for employing the processing method defined above.

According to the invention, a motor vehicle comprises a power-assistance device defined above.

BRIEF DESCRIPTION OF THE DRAWINGS

The attached drawing shows, by way of example, an embodiment of a power-assistance device according to the invention and a mode of execution of a data-processing method according to the invention.

FIG. 1 is a diagram of a vehicle equipped with a power-assistance device according to the invention.

FIG. 2 is a flow diagram schematically showing the overall functioning of a power-assistance device according to the invention.

DETAILED DESCRIPTION

Figure 3:
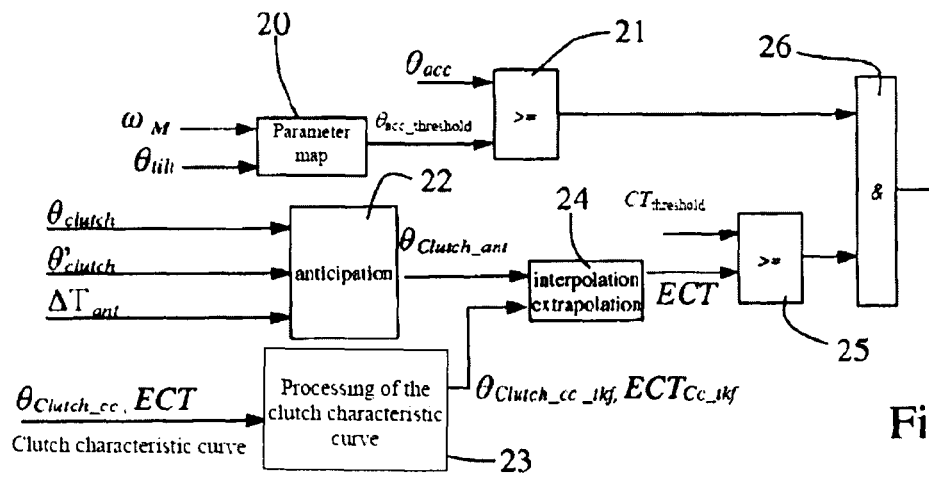
FIG. 3 is a flow diagram schematically showing the detailed functioning of the "pull-away" block appearing in the preceding figure.

Motor vehicle 7 shown in FIG. 1 comprises a device for power-assistance of uphill maneuvers 8. This device is connected to the rest 6 of the vehicle, with which it exchanges items of information via a CAN bus connection 4.

The power-assistance device comprises mainly:
a computer 1 connected to the CAN bus connection and
a sensor 2 of the slope on which the vehicle is located, a clutch-pedal position sensor and a parking-brake system 5 connected to the computer.

The structure and functioning of the power-assistance device are described in detail from line 23 page 12 to line 27 page 33 of the publication of French Patent Application FR 2828450 A1 in reference to FIGS. 1 to 8. In particular, its structure is described from line 23 page 12 to line 16 page 16 in reference to FIGS. 1 and 2 and from line 4 page 20 to line 23 page 22 in reference to FIG. 4.

The parking-brake system is described in particular from line 10 page 14 to line 11 page 15 of the aforesaid publication in reference to FIG. 2.

The rest of the vehicle comprises traditional devices of a modern vehicle and especially means for determining and transmitting vehicle information items such as the engine speed, the velocity or the position of the accelerator pedal.

In the rest of the description, use will be made of different physical variables and their designations, a correspondence list of which is as follows:

| | |
|---|---|
| CT | Torque transmitted by the clutch, |
| ECT | Estimate of the torque that can be transmitted by the clutch by reading from a clutch characteristic curve, |
| $\theta_{acc}$ | Accelerator-pedal position, |
| $\theta_{clutch}$ | Clutch-pedal position, |
| $\dot{\theta}_{clutch}$ | Instantaneous derivative of the clutch-pedal position, |
| $\theta_{tilt}$ | Slope of the gradient on which the vehicle is located, |
| m | Mass of the vehicle, |
| b | Position of the gearshift lever, |
| r(b) | Relationship giving the gear reduction ratio between the output shaft of the engine and the shaft of the driving wheel as a function of the position of the gearshift lever, |
| $\rho_{wheels}$ | Radius of the tires of the driving wheels under load, |
| $\omega_M$ | Engine speed, |
| N | Number of points defining a clutch characteristic curve, |
| CC | Characteristic curve giving on the ordinate the torque that can be transmitted by the clutch as a function of the clutch-pedal position on the abscissa, a characteristic curve such as generated following a transitional phase of learning torque values as a function of values of the clutch-pedal position, the abscissa of the i-th point of the curve is denoted by $\theta_{clutch\_CC}(i)$, its ordinate by $ECT_{CC}(i)$, |
| CCtkf | Characteristic curve resulting from processing of the characteristic curve CC by the data-processing method according to the invention, the abscissa of the i-th point of the curve is denoted by $\theta_{clutch\_CC\_tkf}(i)$, its ordinate by $ECT_{CC\_tkf}(i)$. |

As described above, the engine of the vehicle of mass m parked on a slope $\theta_{tilt}$ must deliver a torque greater than $CT_{threshold}$ to make the vehicle advance.

$CT_{threshold}$=r(b)×$\rho_{wheels}$×m×g×sin($\theta_{tilt}$), where g is the normal of the earth's gravitational field.

As explained, according to the strategy used by the power-assistance device, the brake system is released at a stop during the clutch-engagement phase as soon as the torque transmitted by the clutch is estimated to be greater than the torque $CT_{threshold}$. A critical operation executed by the power-assistance device lies in this estimation of the transmitted torque. To achieve this, the power-assistance device uses in particular the information about the clutch-pedal position and a clutch characteristic curve.

The overall functioning of the power-assistance device is explained hereinafter with reference to FIG. 2.

In a first functional block 10, the signals originating from diverse sensors with which the vehicle is equipped are acquired and formatted. These signals are in particular transmitted via the CAN bus connection.

In a second functional block 11, the clutch characteristic curve is defined. This block comprises:
a sub-block 12, in which the currently selected gearbox ratio is determined,
a sub-block 14, in which data are acquired, especially on the clutch-pedal position and on the torque transmitted by the clutch, and
a sub-block 15, in which the items of information of block 10 and of sub-blocks 12 and 14 are used to update the clutch characteristic curve.

In a third functional block 16, the clutch characteristic curve defined in block 11 is used together with the items of information of block 10 to determine the state that must be occupied by an output 17 controlling release of the parking-brake system.

The structure of blocks 10 and 11 and the functioning thereof are identical to those described in the publication of Application FR 2828450 A1.

The functioning of this third functional block 16 is described in detail hereinafter with reference to FIG. 3.

In a first block 20, a threshold accelerator-pedal position, short of which unclamping or release of the parking-brake system must not be commanded, is delivered as a function of the engine speed and of the slope on which the vehicle is located. This threshold position is defined by a parameter map, or in other words data are recorded in a memory of the power-assistance device causing a threshold value of position to correspond in a coordinate system to values of engine speed on the abscissa and slope on the ordinate.

In block 21, the instantaneous accelerator-pedal position $\theta_{acc}$ is compared with the threshold value established at the output of block 20. If the instantaneous accelerator-pedal position is higher than the threshold value established at the output of block 20, the output of block 21 is active or in high state.

In block 22, the data of clutch-pedal position, of the instantaneous derivative of this position with respect to time and of a time parameter $\Delta T_{ant}$ are used to deliver an anticipated clutch-pedal position $\theta_{clutch\_ant}$ at the output. The formula used is, for example: $\theta_{clutch\_ant}=\theta_{clutch}+\dot{\theta}_{clutch}\times\Delta T_{ant}$. The parameter $\Delta T_{ant}$ may depend on one or more variables, especially the slope.

In block 23, the data delivered by functional block 11 of FIG. 2 and defining the clutch characteristic curve are processed to obtain a processed or modified clutch characteristic curve at the output. The data-processing method is described in detail hereinafter.

In block 24, the modified clutch characteristic curve and the anticipated clutch-pedal position are used to obtain, by interpolation or extrapolation, an estimate ECT of the torque value transmitted by the clutch.

This estimated torque value is compared in a block 25 with the torque $CT_{threshold}$ necessary to make the vehicle advance. If the estimated value of the torque transmitted to the clutch is greater than the torque $CT_{threshold}$ necessary to make the vehicle advance, the output of block 25 is active or in high state.

The outputs of blocks 21 and 25 act on an AND logic gate commanding, at the output, unclamping or release of the brake system when it is active or in high state.

Figure 4:
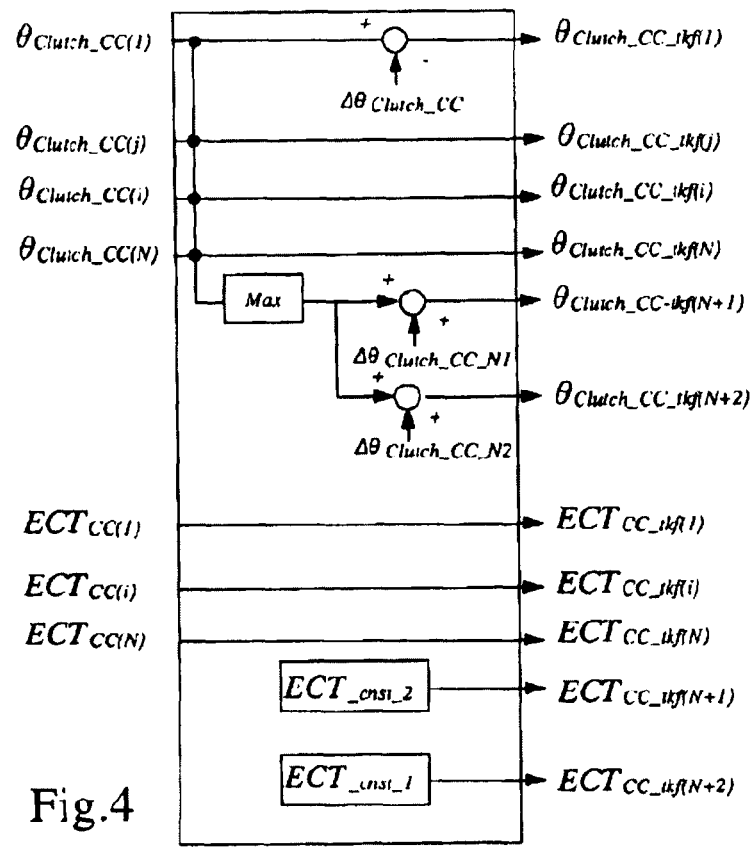
FIG. 4 is a diagram presenting a mode of execution of the data-processing method according to the invention.
Figure 5:
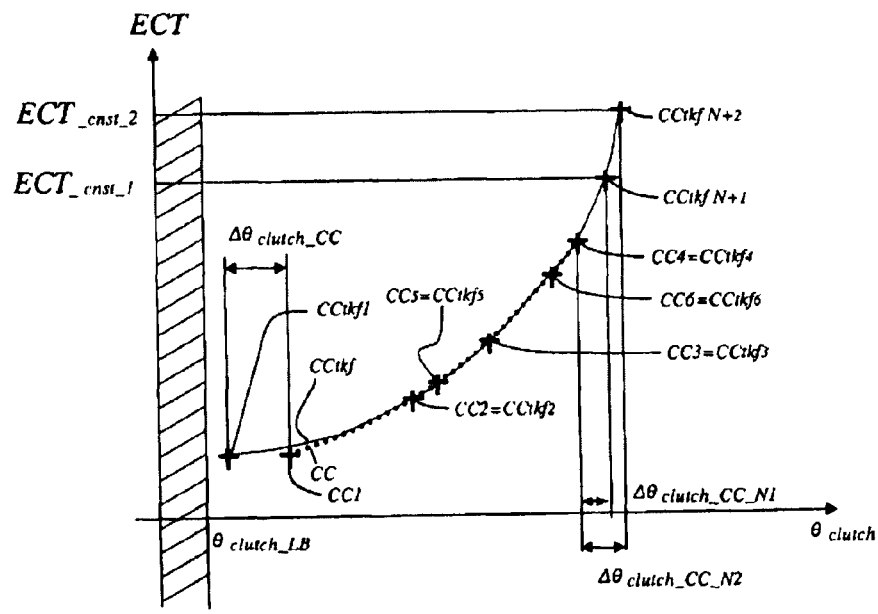
FIG. 5 is a graph representing two clutch characteristic curves, one such as defined by data recorded during an acquisition phase, the other such as defined by data obtained by processing according to the method of the invention.

The data-processing method according to the invention now is described with reference to FIG. 4.

It is supposed that block 11 of FIG. 2 furnishes a matrix with two columns and N rows containing data defining the clutch characteristic curve CC or more generally a correspondence relationship between torque values and values of the clutch-pedal position. Each row i of the matrix corresponds to a pair of coordinates $CC_i(\theta_{clutch\_CC}(i), ECT_{CC}(i))$. An example of such a curve CC is represented by a dotted line in FIG. 5.

In a first procedure, $\theta_{clutch\_CC\_tkf(1)} = \max(\theta_{clutch\_CC}(1) - \Delta\theta_{clutch\_CC}; \theta_{clutch\_LB})$ is calculated, the first and second values $\Delta\theta_{clutch\_CC}$ and $\theta_{clutch\_LB}$ being predefined parameters stored in memory in an element of the power-assistance device, such as in a memory of computer 1. For example, $\Delta\theta_{clutch\_CC}$ can be equal to 5% of the clutch-pedal travel and $\theta_{clutch\_LB}$ can be equal to 15% of the clutch-pedal travel.

In other words, the first value $\Delta\theta_{clutch\_CC}$ is subtracted from the smallest value $\theta_{clutch\_CC}(1)$ of the clutch-pedal position if the result is not smaller than the second value $\theta_{clutch\_LB}$. In the opposite case, the smallest value $\theta_{clutch\_CC}(1)$ of the clutch-pedal position is replaced by the second value $\theta_{clutch\_LB}$. The new datum obtained in this way then serves to define the first point of the modified clutch characteristic curve CCtkf. In this first procedure, the other data are unchanged.

By virtue of such a modification of the curve, in the case in which the vehicle is immobilized on a gentle slope or on level pavement, it is assured that the brake system is unclamped or released in anticipated manner compared with what would happen under the same conditions with the power-assistance device described in the publication of French Patent Application FR 2828450 A1. It follows that the user no longer feels any straining of the elements connecting to the ground before the vehicle starts.

In a second procedure, two new pairs of data are added to the matrix mentioned above, thus transforming it to a matrix with two columns and N+2 rows. To accomplish this, the upper bound of the values contained in the first column of the N×2 matrix is selected: $\max_{i=1 \text{ to } N}(\theta_{clutch\_CC}(i))$. Two new values of clutch-pedal position, $\theta_{clutch\_CC\_tkf(N+1)}$ and $\theta_{clutch\_CC\_tkf(N+2)}$, are then recorded in the matrix, these values being defined respectively by the relationships:

$\theta_{clutch\_CC\_tkf(N+1)} = \max_{i=1 \text{ to } N}(\theta_{clutch\_CC}(i)) + \Delta\theta_{clutch\_CC\_tkf(N+1)}$, and $\theta_{clutch\_CC\_tkf(N+2)} = \max_{i=1 \text{ to } N}(\theta_{clutch\_CC}(i)) + \Delta\theta_{clutch\_CC\_tkf(N+2)}$, $\Delta\theta_{clutch\_CC\_tkf(N+1)}$ and $\Delta\theta_{clutch\_CC\_tkf(N+2)}$ being predefined parameters such that $0 < \Delta\theta_{clutch\_CC\_tkf(N+1)} < \Delta\theta_{clutch\_CC\_tkf(N+2)}$.

Two new torque values, ECT_cnst_1 and ECT_cnst_2, respectively associated with the new clutch-pedal positions $\theta_{clutch\_CC\_tkf(N+1)}$ and $\theta_{clutch\_CC\_tkf(N+2)}$, are also recorded in the matrix. The values of the parameters ECT_cnst_1 and ECT_cnst_2 are chosen in such a way that: $\max_{i=1 \text{ to } N}(ECT_{CC}(i)) < ECT\_cnst\_1 < ECT\_cnst\_2$.

The parameters $\Delta\theta_{clutch\_CC\_tkf(N+1)}$, $\Delta\theta_{clutch\_CC\_tkf(N+2)}$, ECT_cnst_1 and ECT_cnst_2 are predefined and stored in memory in an element of the power-assistance device, such as in a memory of computer 1. As an example, ECT_cnst_1 may be equal to 80 Nm, ECT_cnst_2 may be equal to 100 Nm, $\Delta\theta_{clutch\_CC\_tkf(N+2)}$ may be equal to 2% of the clutch-pedal travel and $\Delta\theta_{clutch\_CC\_tkf(N+1)}$ may be equal to 1% of the clutch-pedal travel.

The new matrix defined in this way contains data defining the clutch characteristic curve CCtkf deduced from the curve CC, or more generally a modified correspondence relationship between the torque values and the values of clutch-pedal position. An example of such a curve CCtkf is represented by the solid line in FIG. 5.

By virtue of the addition of such data in the matrix, it is possible to achieve extrapolation of the torque transmitted by the clutch in the presence of a large value of clutch-pedal position. In fact, the slope used for extrapolation of these values is defined by these data. This slope is defined by the relationship: $(ECT\_cnst\_2 - ECT\_cnst\_1)/(\theta_{clutch\_CC\_tkf(N+2)} - \theta_{clutch\_clutch\_CC\_tkf(N+1)})$ To execute these different data-processing procedures, the power-assistance device comprises suitable hardware and software means. In particular, the device comprises a memory comprising not only the different predefined parameters mentioned above but also the different values of clutch-pedal positions and torques constituting the matrixes. This memory may, for example, be part of the computer. The device also comprises calculating means for performing mathematical operations on the values stored in memory as well as means for writing values in and deleting values from memory. These different means themselves are, for example, also contained in the computer. The device also comprises software means, or in other words algorithms for governing the sequences of operations to be executed in the procedures of this data-processing method. These algorithms themselves may also be entered into memory in the computer.

In particular, to determine a value of the torque transmitted by the clutch on the basis of a value of clutch-pedal position, it is possible to use a linear interpolation formula if the value of clutch-pedal position falls between two values of clutch-pedal position contained in the 2×N+2 matrix defining the curve CCtkf. This formula uses the data relating to the two values of clutch-pedal position closest to the value of clutch-pedal position for which it is wished to determine the transmitted torque and bracketing that value of clutch-pedal position for which it is wished to determine the transmitted torque. The value of transmitted torque may be fixed at zero if the value of clutch-pedal position is lower than the smallest value of clutch-pedal position contained in the 2×N+2 matrix defining the curve CCtkf. A linear extrapolation formula may then be used if the value of clutch-pedal position is higher than the largest of the values of clutch-pedal position contained in the 2×N+2 matrix defining the curve CCtkf. This linear extrapolation formula uses the data relating to the largest of the values of clutch-pedal position contained in the 2×N+2 matrix and the extrapolated slope value mentioned above. Thus a torque value can be determined even if the curve CCtkf is not monotonic.

The invention claimed is:

1. A method for controlling a motor vehicle and processing data recorded during a data-acquisition operation, the recorded data defining, according to a first characteristic curve, a correspondence relationship between values of torque transmitted by a clutch and values of position of a clutch-control device, an initial scope of the recorded data as it relates to values of position of the clutch-control device being defined from lowest and highest recorded values of position of the clutch-control device, the initial scope of the recorded data being less than a maximum scope of lowest and highest values of position of the clutch-control device, the processing method comprising:

predefining and storing clutch-control device position data, which is different from the clutch-control device position data of the recorded data, the predefined clutch-control device position data including a predefined change in clutch-control device position;

recording, in a table, the clutch-control device position data and torque data as the initial scope of the recorded data;

based on said predefined clutch-control device position data, appending clutch-control device position data outside the initial scope to the recorded data in the table to define, according to a modified characteristic curve, a modified correspondence relationship between values of torques transmitted by the clutch and values of positions of the clutch-control device, the modified correspondence relationship to be used in a device for power assistance of uphill maneuvers of the motor vehicle including a motive power assembly connected to driving wheels by a kinematic chain including the clutch and a brake system, the power-assistance device automatically commanding release of the brake system; and controlling the device for power assistance of uphill maneuvers of the motor vehicle according to the table that defines the modified correspondence relationship between values of the torques transmitted by the clutch and the values of the positions of the clutch-control device.

2. The processing method according to claim 1, wherein said appending the recorded data includes a procedure of substituting a substitution value for a smallest value of position of the clutch-control device, the substitution value being smaller than said smallest value.

3. The processing method according to claim 2, wherein the substitution value is greater than or equal to a predefined value, the predefined value being greater than an initial, non-displaced position of the clutch-control device.

4. The processing method according to claim 2, wherein the substitution value is represented by $\theta_{clutch\_CC\_tkf(1)}$, which is defined by:

$\theta_{clutch\_CC\_tkf(1)} = \max(\theta_{clutch\_CC}(1) - \Delta\theta_{clutch\_CC};$ $\theta_{clutch\_LB})$, where $\theta_{clutch\_CC}(1)$ is the smallest recorded value of position of the clutch-control device, and wherein $\Delta\theta_{clutch\_CC}$ and $\theta_{clutch\_LB}$ are predefined parameters of the predefined clutch-control device position data and are stored in memory in an element of the power-assistance device.

5. The processing method according to claim 4, wherein $\Delta\theta_{clutch\_CC}$ is substantially equal to 5% of a clutch-control device travel amount, and $\Delta\theta_{clutch\_LB}$ is substantially equal to 15% of the clutch-control device travel amount.

6. The processing method according to claim 1, wherein said appending the recorded data includes adding two pairs of values, of positions of the clutch-control device and of torque values, such that the values of added torques are greater than the torque values of the recorded data.

7. The processing method according to claim 6,
wherein a first added position of the clutch-control device is represented by $\theta_{clutch\_CC\_tkf(N+1)}$, which is defined by:

$\theta_{clutch\_CC\_tkf(N+1)} = \max_{i=1 \; to \; N}(\theta_{clutch\_CC}(1)) + \Delta\theta_{clutch\_CC\_tkf(N+1)}$, where $\max_{i=1 \; to \; N}(\theta_{clutch\_CC}(i))$ is the maximum of value of position of the clutch-control device, and $\theta_{clutch\_CC\_tkf(N+1)}$ is a first added value of clutch-control device travel, and wherein a second added position of the clutch-control device $\theta_{clutch\_CC\_tkf(N+2)}$ is defined by $\theta_{clutch\_CC\_tkf(N+2)} = \max_{i=1 \; to \; N}(\theta_{clutch\_CC}(i)) + \Delta\theta_{clutch\_CC\_tkf(N+2)}$, where $\Delta\theta_{clutch\_CC\_tkf(N+2)}$ is a second added value of the clutch-control device travel, $\Delta\theta_{clutch\_CC\_tkf(N+1)}$.

8. The processing method according to claim 7, wherein $\Delta\theta_{clutch\_CC\_tkf(N+1)}$ and $\Delta\theta_{clutch\_CC\_tkf(N+2)}$ are predefined parameters of the predefined clutch-control device position data such that:

$0 < \Delta\theta_{clutch\_CC\_tkf(N+1)} < \Delta\theta_{clutch\_CC\_tkf(N+2)}$.

9. The processing method according to claim 8, wherein $\Delta\theta_{clutch\_CC\_tkf(N+2)}$ is substantially equal to 2% of the clutch-control device travel, and $\Delta\theta_{clutch\_CC\_tkf(N+1)}$ is substantially equal to 1% of the clutch-control device travel.

10. The processing method according to claim 1, wherein said appending the predefined data expands the initial range of the correspondence relationship between values of torque transmitted by the clutch and values of position of the clutch-control device, to a value of the position of the clutch-control device that is smaller than that of the recorded data.

11. The processing method according to claim 1, wherein said appending the predefined data expands the initial range of the correspondence relationship between values of torque transmitted by the clutch and values of position of the clutch-control device, to values of position of the position of the clutch-control device larger than those of the recorded data.

12. The processing method according to claim 1, further comprising determining a torque value to apply based on a position of the clutch-control device, wherein, when a detected value of the position of the clutch-control device is between the minimum and maximum values of position of the clutch-control device in the appended table, said determining torque uses linear interpolation based on the modified characteristic curve to determine the torque value to apply, and wherein, when the detected value of the position of the clutch-control device is outside the minimum and maximum values of position of the clutch-control device in the appended table, said determining torque uses linear extrapolation based on the modified characteristic curve to determine the torque value to apply.

13. A non-transitory computer readable medium storing a program that, when executed by a computer, causes the computer to execute a method comprising:

defining a correspondence relationship between recorded values of torque transmitted by a clutch and values of position of a clutch-control device, an initial scope of the recorded data as it relates to values of position of the clutch-control device being defined from lowest and highest recorded values of position of the clutch-control device, the initial scope of the recorded data being less than a total scope of lowest and highest values of position of the clutch-control device;

predefining and storing in memory clutch-control device position data, which is different from the clutch-control device position data of the recorded data, the predefined clutch-control device position data including a predefined change in clutch-control device position;

recording, in a table, the clutch-control device position data and torque data as the initial scope of the recorded data; and based on said predefined clutch-control device position data, appending clutch-control device position data outside the initial scope to the recorded data in the table to define a modified correspondence relationship between values of torques transmitted by the clutch and values of positions of the clutch-control device, the modified correspondence relationship to be used in a device for power assistance of uphill maneuvers of a motor vehicle including a motive power assembly connected to driving wheels by a kinematic chain including the clutch and a brake system, the power-assistance device automatically commanding release of the brake system; and controlling the device for power assistance of uphill maneuvers of the motor vehicle according to the table that defines the modified correspondence relationship between values of the torques transmitted by the clutch and the values of the positions of the clutch-control device.

14. The non-transitory computer readable medium according to claim 13, wherein the method further comprises determining a torque value to apply based on a position of the clutch-control device, wherein, when a detected value of the position of the clutch-control device is between the minimum and maximum values of position of the clutch-control device in the appended table, said determining torque uses linear interpolation to determine the torque value to apply, and wherein, when the detected value of the position of the clutch-control device is outside the minimum and maximum values of position of the clutch-control device in the appended table, said determining torque uses linear extrapolation to determine the torque value to apply.

15. A device for power assistance of uphill maneuvers of a motor vehicle comprising:

at least one sensor that acquires slope data;

at least one sensor that acquires clutch-pedal data;

at least one parking brake system that holds the motor vehicle in position;

at least one memory that records in a table the acquired clutch-pedal data and torque data as recorded data having an initial scope, and that stores predefined clutch-pedal position data, which is different from the clutch-pedal data of the recorded data, the predefined clutch-pedal position data including a predefined change in clutch-pedal position, and the initial scope of the recorded data being less than a maximum defined scope of lowest and highest values of clutch-pedal position; and at least one computer that communicates with the at least one memory and sensors, that appends, based on the predefined clutch-pedal position data, clutch-pedal position data outside the initial scope to the recorded data in the table to define a modified correspondence relationship between values of torques transmitted by a clutch and values of clutch-pedal positions, and that controls the at least one parking brake system based on the table.

16. A motor vehicle comprising a power-assistance device according to claim 15.

17. The device according to claim 15, wherein the at least one computer determines a torque value to apply based on a position of a clutch pedal, wherein, when a detected value of the position of the clutch pedal is between the minimum and maximum values of position in the appended table, the torque is determined by the at least one computer using linear interpolation, and wherein, when the detected value of the position of the clutch pedal is outside the minimum and maximum values of position in the appended table, the torque to apply is determined by the at least one computer using linear extrapolation.

* * * * *